(12) United States Patent
Funato et al.

(10) Patent No.: US 7,679,644 B2
(45) Date of Patent: Mar. 16, 2010

(54) DIGITAL CAMERA

(75) Inventors: Kenichi Funato, Tokyo (JP); Kenji Kojima, Tokyo (JP)

(73) Assignee: Fujifilm Corporation, Tokyo (JP)

(*) Notice: Subject to any disclaimer, the term of this patent is extended or adjusted under 35 U.S.C. 154(b) by 1245 days.

(21) Appl. No.: 11/206,026

(22) Filed: Aug. 18, 2005

(65) Prior Publication Data
US 2006/0039031 A1    Feb. 23, 2006

(30) Foreign Application Priority Data
Aug. 20, 2004  (JP)  ............................. 2004-241166

(51) Int. Cl.
*H04N 5/225*  (2006.01)

(52) U.S. Cl. .................................. 348/207.2

(58) Field of Classification Search ............... 348/207.2, 348/207.99; D16/136, 206, 211, 212, 223, D16/229
See application file for complete search history.

(56) References Cited

U.S. PATENT DOCUMENTS

| | | | | |
|---|---|---|---|---|
| 4,937,676 A | * | 6/1990 | Finelli et al. | 348/375 |
| 7,184,086 B2 | * | 2/2007 | Tamura | 348/333.06 |
| 7,551,202 B2 | * | 6/2009 | Silverbrook | 348/207.2 |
| 2004/0125209 A1 | * | 7/2004 | Silverbrook et al. | 348/207.2 |
| 2007/0188472 A1 | * | 8/2007 | Ghassabian | 345/169 |

FOREIGN PATENT DOCUMENTS

| | | |
|---|---|---|
| JP | 2000-180934 A | 6/2000 |
| JP | 2001-69386 A | 3/2001 |
| JP | 2001-218096 A | 8/2001 |
| JP | 2003-110909 A | 4/2003 |
| JP | 2003-110912 A | 4/2003 |
| JP | 2003-250074 A | 9/2003 |

* cited by examiner

*Primary Examiner*—Lin Ye
*Assistant Examiner*—Euel K Cowan
(74) *Attorney, Agent, or Firm*—Birch, Stewart, Kolasch & Birch, LLP

(57) ABSTRACT

The present invention provides a digital camera comprising a planar image display device, a camera body coupled to an end of the image display device, and a printer device coupled to another end of the image display device. In the digital camera, the camera body and/or the printer device can store the image display device, and the camera body and the printer device can be coupled to each other through a coupling device when the image display device is stored.

4 Claims, 5 Drawing Sheets

DIGITAL CAMERA

BACKGROUND OF THE INVENTION

1. Field of the Invention

The present invention relates to a digital camera, and more specifically to a digital camera which has a printer and can be a compact unit when it is stored.

2. Related Art

Recently, it is normal that a quickly and widely spread digital camera (electronic camera) has a relatively large image display device. A liquid crystal display (LCD) is widely adopted as an image display device.

To satisfy the request to produce a compact unit, there has been a proposition of adopting an organic EL (electro-luminescence) display using an organic EL device (refer to Japanese Patent Application Laid-Open No. 2000-180934).

SUMMARY OF THE INVENTION

However, with the conventional configuration in which a conventional image display device is attached to the housing of a digital camera, it is hard to satisfy a request to produce a smaller unit.

In the conventional digital camera, although a taken image can be confirmed immediately after shooting, it is necessary to connect the camera to a separate printer to print the image on photographic paper. Therefore, the request to easily obtain a printed image anywhere is not completely satisfied.

The present invention has been developed to solve the above-mentioned problems, and aims at providing a digital camera which is provided with a printer and can be a compact unit when it is stored.

To attain the above-mentioned objective, the present invention provides a digital camera including: a planar image display device; a camera body coupled to an end of the image display device; and a printer device coupled to another end of the image display device. With the configuration, the camera body and/or the printer device can store the image display device; and the camera body and the printer device can be coupled to each other through a coupling device when the image display device is stored.

According to the present invention, the digital camera includes a printer device, the camera body and/or printer device include a planar image display device, and the camera body and the printer device can be coupled when the image display device is stored. Therefore, the printer device can print a taken image of a printer device onto printing paper, etc. immediately after shooting, and has an excellent characteristic of a very compact unit when stored, which cannot be realized by the conventional technology.

In the present invention, when the printer device performs printing, it is preferable to provide an ejection device for ejecting printing paper substantially parallel to the image display device. If the printing paper is ejected as described above, the printed image can be confirmed while checking a taken image.

In the present invention, it is preferable that the image display device is a flexible electronic display. With a flexible electronic display, it is easy to store it in the camera body and/or printer device. A flexible electronic display can be an organic EL display, a liquid crystal display using a plastic film, etc.

Furthermore, in the present invention, it is preferable that the printer device can perform printing when an image is displayed on the image display device. Thus, if a taken image can be printed while checking it, a printed image can be printed and distributed as many as necessary at a place where a number of persons get together at a party, etc., thereby realizing a desired use of a digital camera.

According to the present invention, a printer device can print a taken image onto a printing paper, etc. immediately after shooting, and the entire device is very compact when the printer device is stored, which cannot be realized by the conventional technology.

DETAILED DESCRIPTION OF THE PREFERRED EMBODIMENTS

Preferred embodiments of the present invention are described below in detail by referring to the attached drawings.

Figure 1:
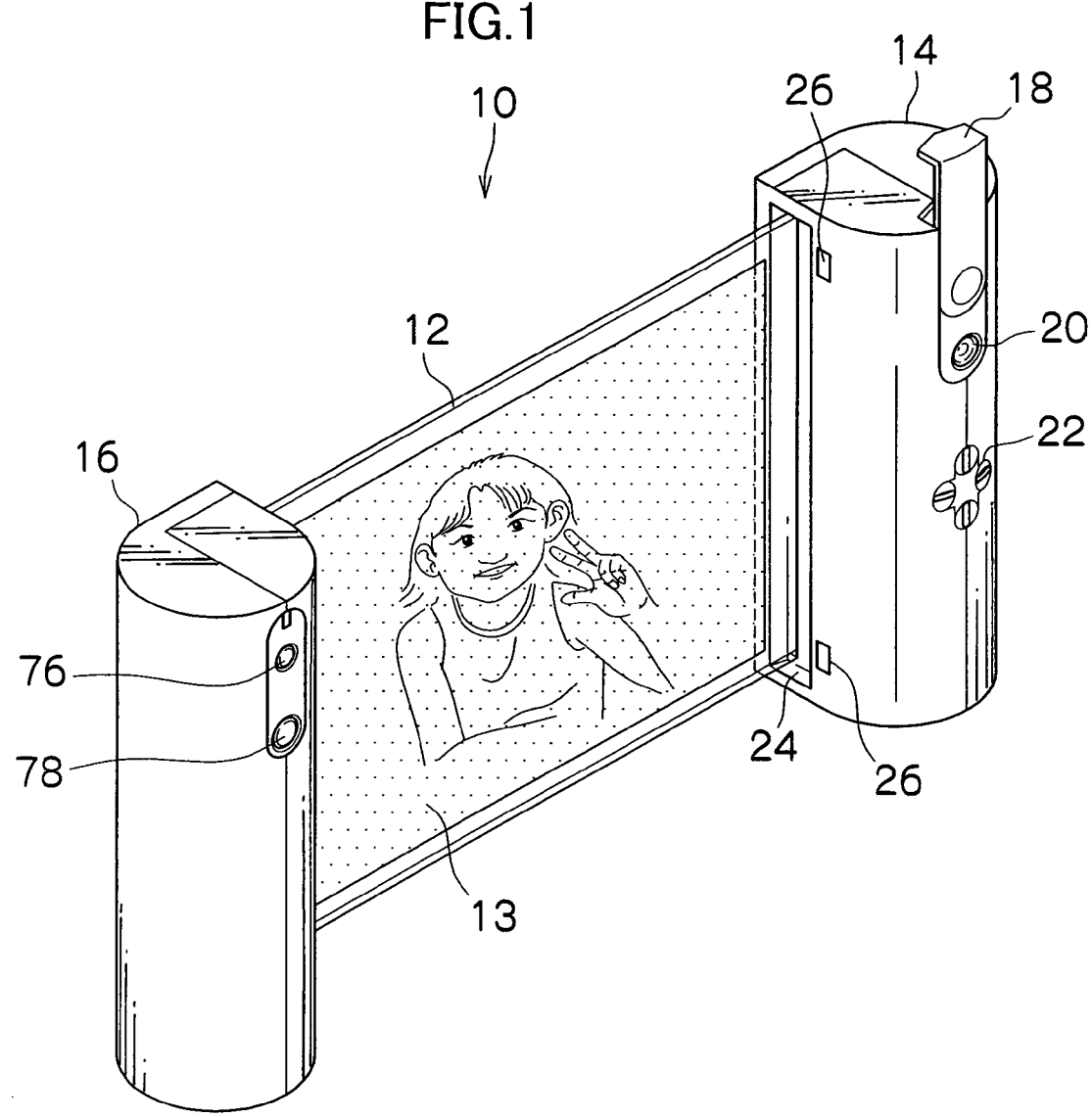
FIG. 1 is a perspective view of the appearance of the digital camera in a use state according to an embodiment of the present invention.
Figure 2:
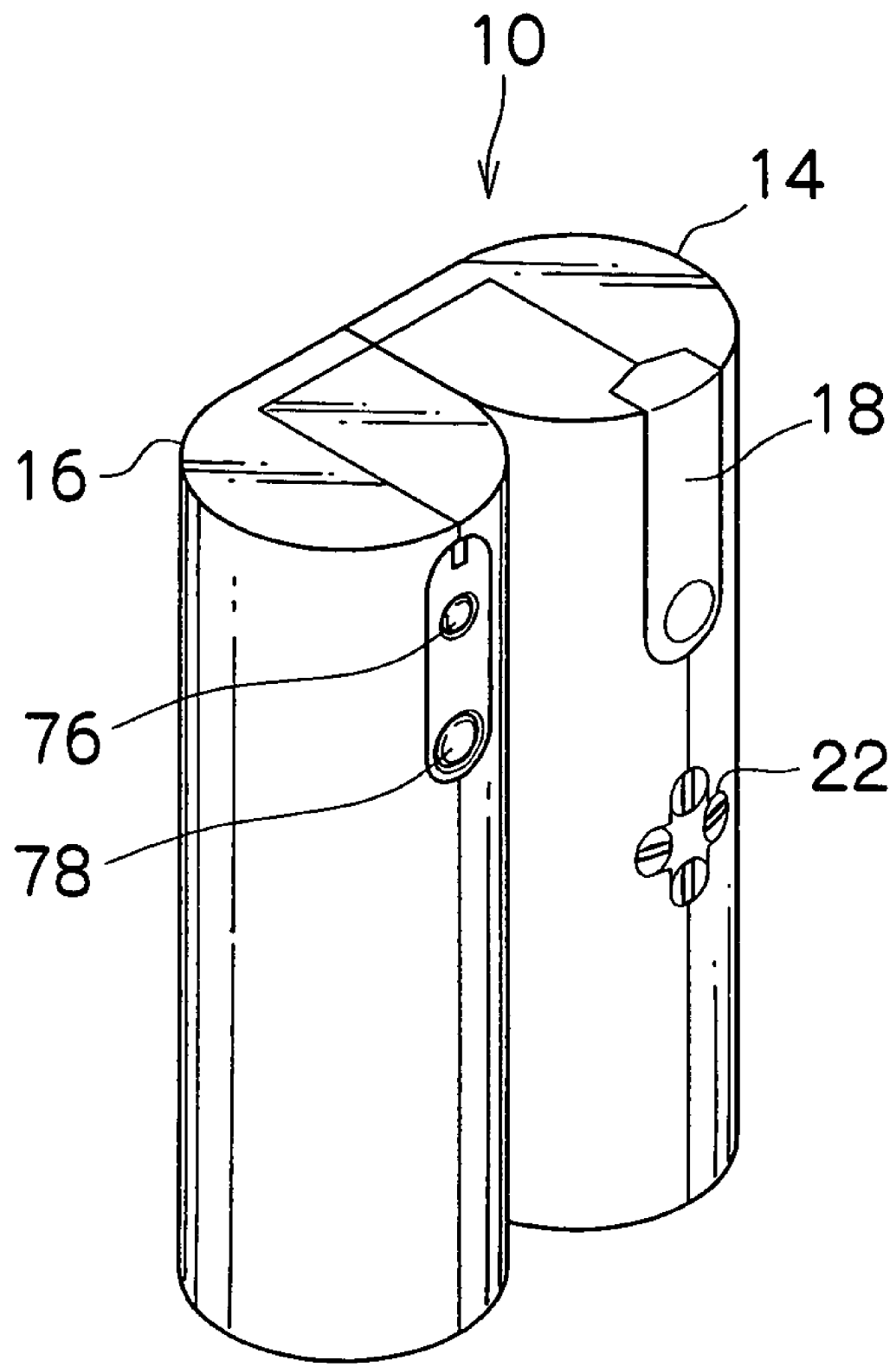
FIG. 2 is a top view of the appearance of the digital camera in a stored state according to an embodiment of the present invention.

FIGS. 1 and 2 are perspective views showing the appearance of a digital camera 10 to which the present invention is applied. In these figures, FIG. 1 shows the use status of the digital camera 10, and FIG. 2 shows the stored status of the digital camera 10.

As shown in FIG. 1, the digital camera 10 comprises an organic EL display 12 which is a planar image display device, a camera body 14 coupled to the right end of the organic EL display 12, and a printer (printer device) 16 coupled to the left end of the organic EL display 12.

The organic EL display 12 functions as a finder during shooting, and functions as a display device during reproduction.

That is, the organic EL display 12 mainly displays an image, that is, displays an image (through moving pictures) taken by a taking lens described later so that a taken image is confirmed before shooting. Additionally, a recorded image is read from a memory card 64 inserted into the digital camera 10 (refer to FIG. 3) for reproduction and display.

The organic EL display 12 is a flexible electronic display that can be stored in the camera body 24 and the printer 16 in a wound state. It is also designed such that the camera body 14 can be coupled to the printer 16 as shown in FIG. 2 with the organic EL display 12 in the completely stored state.

As a configuration for coupling, for example, a combination of magnets 26 above and below the left side of the camera body 14, and another combination of magnets (not shown in the attached drawings) provided at a corresponding portion on the right side of the printer 16 can be adopted.

The camera body 14 is a substantially cylindrical housing, and functions as a common digital camera (electronic camera). The details are described later by referring to FIG. 3. One or both of the camera body 14 and the printer 16 functions as a grip portion of the digital camera 10.

As shown in FIG. 1, on the upper rear side of the camera body 14, a slide unit 18 is provided. In the stored state, the slide unit 18 is not projected outside but is stored along the contour of the camera body 14. In the use state, it is projected upward from the camera body 14 as shown in FIG. 1.

The slide unit 18 also functions as a power source switch of the digital camera 10. That is, the power is turned off in the stored state as shown in FIG. 2, and the power is turned on in the extended state as shown in FIG. 1.

In the extended state (power-on state) of the slide unit 18 as shown in FIG. 1, a shutter button 20 of the camera body 14 is exposed to the rear, and the taking lens (not shown in the attached drawings) provided at the upper front of the slide unit 18 is exposed to the front.

The shutter button 20 is designed in the 2-stage configuration. When the shutter button 20 is gently pressed and held in the "half-pressed" state, the auto-focus control (AF) and the auto-exposure control (AE) work, and the AF and the AE are locked. When the shutter button 20 in "half-pressed" state is further pressed to the "fully-pressed" state, shooting is performed as described later.

In the image forming position of the taking lens in the slide unit 18, a CCD (image pickup element) 52 (refer to FIG. 3) not shown in FIG. 1 is arranged.

In the intermediate portion on the rear of the camera body 14, a cross cursor button 22 is provided. The cross cursor button 22 functions as a mode switch, a zoom central position directive device, a zoom factor directive device, etc.

On the left side of the camera body 14, a slit aperture 24 is provided over a substantially full length in the vertical direction. Through the slit aperture 24, the organic EL display 12 is contained in the camera body 14.

Although not shown in FIGS. 1 and 2, a memory slot for inserting the memory card 64 as a recording medium (refer to FIG. 3) is provided in the camera body 14. A card reader/writer device 63 built in the camera body 14 records and stores a taken image as image data on the memory card 64, and can also read a recorded image from the memory card 64. In the present embodiment, for example, SmartMedia is used as the memory card 64, but a recording medium in the digital camera 10 can also be a PC card, a flash memory card, an IC card, a floppy disk card, a magneto optical disk (MO), etc.

Figure 3:
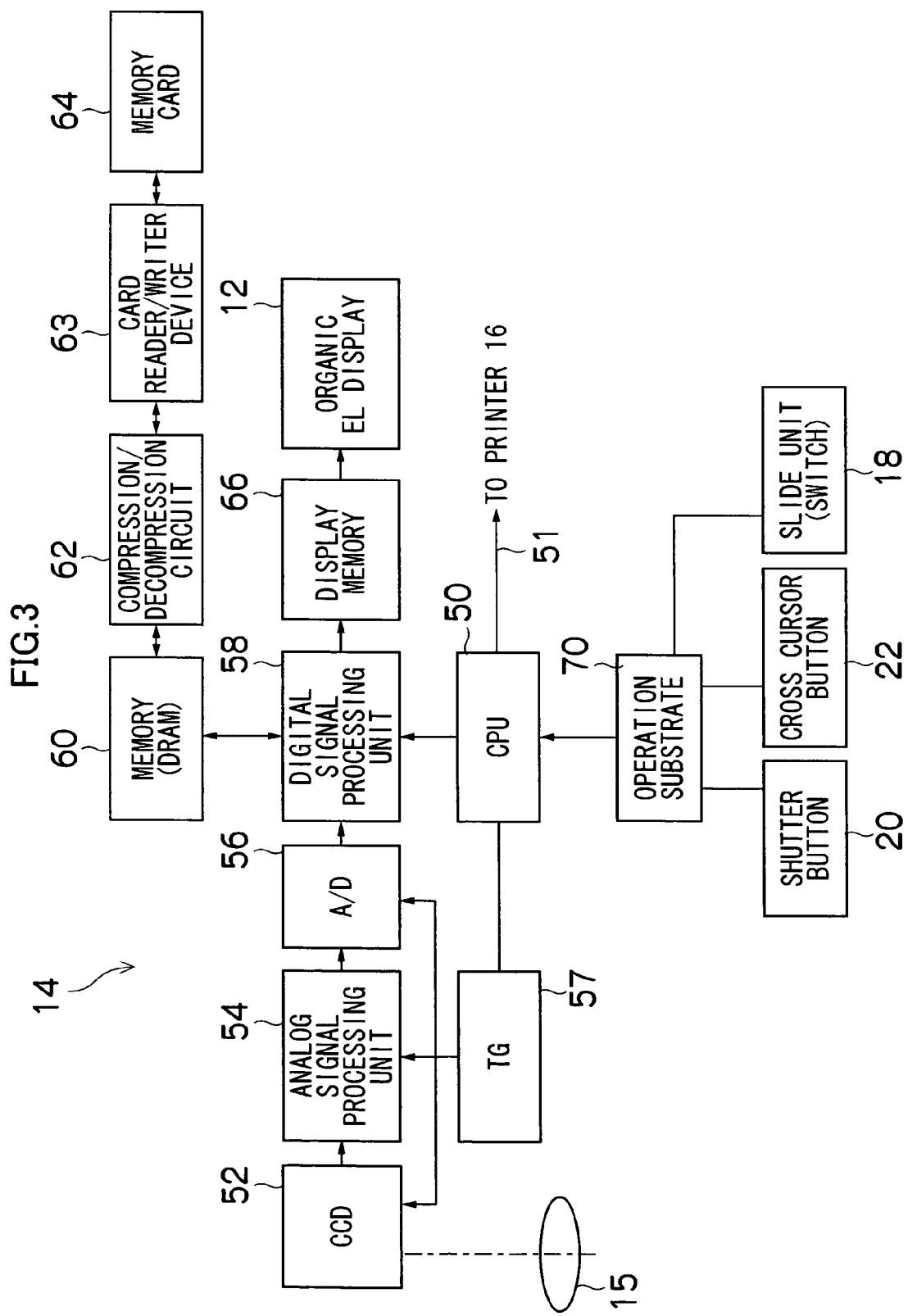
FIG. 3 is a block diagram of the internal configuration of a camera body.

FIG. 3 is a block diagram showing the internal configuration of the camera body 14. The camera body 14 is mainly configured by an operation substrate 70 comprising a zoom factor directive device and a zoom central position directive device, a central processing unit (CPU) 50, the CCD 52, an analog signal processing unit 54, a digital signal processing unit 58 comprising a frame display unit and an image capturing device, a display memory 66 comprising a display device, the card reader/writer device 63, the memory card 64, etc.

The operation substrate 70 is connected through a circuit to each operation member shown in FIGS. 1 and 2, and outputs a directive signal to the CPU 50 based on the operation (for example, an operation of the cross cursor button 22, etc.) of the operation members.

The CPU 50 outputs a control signal to the digital signal processing unit 58 based on the input of the directive signal from the operation substrate 70, and integrally controls each circuit.

The CPU 50 determines whether or not slur has occurred under the current shooting control (shutter speed, F value, etc.). If there is a slur condition, a slur warning is issued at the corner of the organic EL display 12. The determination as to whether or not there is a slur is based on the flow similar to the well-known (marketed) flow of the digital camera.

Furthermore, the CPU 50 is connected to the printer 16 through a signal cable 51. The signal cable 51 is provided on the opposite side of a display screen 13 of the organic EL display 12.

The CCD (image pickup element) 52 converts light of a subject entered through a taking lens 15 and formed as an image, to a signal charge of an amount depending on the incident light. The signal charge is sequentially read from the CCD 52 as a voltage signal (image signal), and added to the analog signal processing unit 54. The image pickup element is no limited to the CCD, but can be a CMOS image sensor, etc.

The analog signal processing unit 54 performs a predetermined analog process such as sampling, a white balance adjustment, etc. on an image signal applied by the CCD 52. Furthermore, an A/D converter 56 converts an analog-processed image signal to image data (digital data), and outputs the data to the digital signal processing unit 58. The CCD 52, the analog signal processing unit 54, and the A/D converter 56 are synchronously operated according to a timing signal from a timing generator (TG) 57.

The digital signal processing unit 58 performs a digital process such as a gamma correction, etc. as necessary on the image data (of all pixel area of the CCD 52) input from the analog signal processing unit 54 (A/D converter 56), and outputs the image data to a display memory 66 (memory 60). In addition, by inputting a control signal for control of the zoom central position zoom factor from the CPU 50 to the digital signal processing unit 58, in addition to the digital process such as the above-mentioned gamma correction, etc., image data of a zoom factor centering the zoom central position is segmented from the image data, a screen of image is generated, and a digital zoom process of capturing the image as an image of a digital zoom area is performed.

The digital signal processing unit 58 configuring a frame display device adds image data of an enlarged frame to the image data treated in the digital zoom process. The enlarged frame is displayed as a size and position of the digital zoom area relative to the entire pixel area (or entire area) based on the digital zoom area (directed by operating the cross cursor button 22 by a person who takes an image) to the entire pixel area (or an all area of the image recorded on the recording medium) taken by the CCD 52. The image data with the enlarged frame added to it is output to the display memory 66.

The memory card 64 records and stores image data. The mode is set as a shooting mode. When a record directive is input by an operation of pressing the shutter button 20, the CPU 50 outputs a control signal to the digital signal processing unit 58, image data of one frame is read from the CCD 52, the digital signal processing unit 58 performs the above-mentioned digital process or a digital zoom process, and the image data is written to the memory 60. An enlarged frame is not added to the image data written to the memory 60. The image data written to the memory 60 is treated in a compressing process by a compression/decompression circuit 62, and the card reader/writer device 63 records and stores the data on the memory card 64.

The organic EL display 12 displays an image (through moving picture) written to the display memory 66. When a shooting mode is set, and the cross cursor button 22 displays a through moving picture, image data is continuously read from the CCD 52 to the digital signal processing unit 58, and the digital signal processing unit 58 performs a digital process, etc. (adding a digital zoom process and an enlarged frame) on image data, and the image data is written to the display memory 66. The image data of the display memory 66 is rewritten by sequentially and newly read image data, and a through moving picture is displayed by the organic EL display 12.

The organic EL display 12 can also display the image recorded and stored on the memory card 64. When a reproduction mode is set, and reproducing of image data recorded on the memory card 64 in a predetermined operation is specified, the image is read from the memory card 64 to the card reader/writer device 63, and is decompressed by the compression/decompression circuit 62, the digital signal processing unit 58 performs a digital process, and then the reproduced image is displayed on the organic EL display 12 through the display memory 66.

Otherwise, the organic EL display 12 can also display the information about the status of a camera, the shooting mode, etc. (that is, the shooting status). For example, the checked remaining amount of the built-in batteries, the possible number of shots, etc. can be displayed.

Since the organic EL display 12 is to allow a shooting person to know the angle of view, the number of pixels can be smaller (lower resolution) than a common liquid crystal display monitor normally used for a personal computer, etc. Thus, the image data written from the digital signal processing unit 58 to the display memory 66 can be of lower resolution with the number of data of image data thinned.

By using the digital camera 10 with the above-mentioned configuration, the image data treated in a digital process, etc. by the digital signal processing unit 58 is displayed on the organic EL display 12, and the shooting person can confirm the image of the entire pixel area of the CCD on the organic EL display 12 (lifesize shooting). Furthermore, when a shooting person presses the cross cursor button 22, the digital signal processing unit 58 performs a digital zoom process, image data with an enlarged frame is displayed on the organic EL display 12, and the shooting person can confirm the zoom factor and the central position of the zoom (digital zoom function) on the organic EL display 12.

Furthermore, the digital signal processing unit 58 performs a digital process on the image data recorded and stored on the memory card 64, and the shooting person can confirm on the organic EL display 12 the image data recorded and stored on the memory card 64 (lifesize reproduction). At this time, if the shooting person presses the cross cursor button 22, the digital zoom process is performed, and the image data with an enlarged frame is displayed on the organic EL display 12 (reproduction zoom function).

In the block diagram shown in FIG. 3 (internal configuration of the camera body 14), the camera body 14 has its unique power source although it is not shown in the attached drawings.

Described below is the printer 16. The printer 16 is a substantially cylindrical housing provided with an ejection device and an image recording device (corresponding to a photographic unit 80 shown in FIG. 4 and described later) to realize the proper functions. The relating configuration is a slit aperture over the full length in the vertical direction formed on the right side of the printer 16.

As with the slit aperture 24 of the above-mentioned camera body 14, there is a slit aperture (not shown in the attached drawings) over the full length in the vertical direction on the right side of the 16, and through the slit aperture, the organic EL display 12 can be contained in the printer 16.

On the upper portion of the rear of the printer 16, a power source switch 76 and a print switch (operation switch) 78 are provided.

Figure 4:
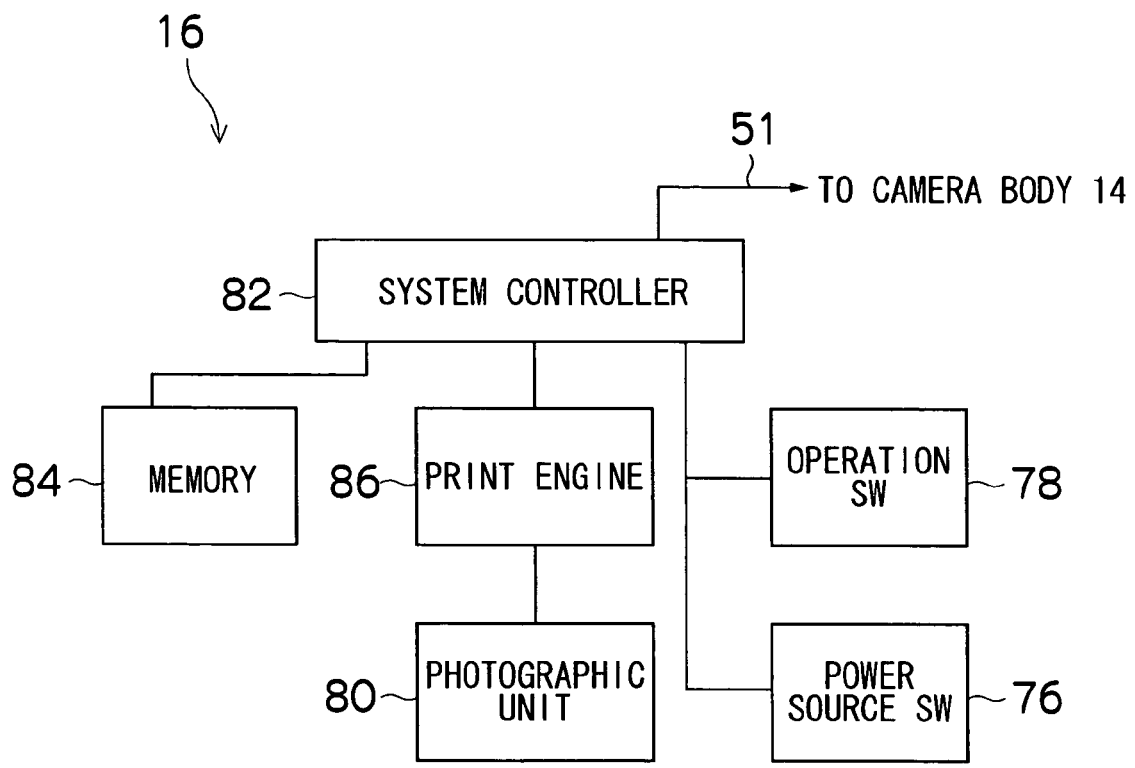
FIG. 4 is a block diagram of the internal configuration of a printer.

FIG. 4 is a block diagram of the configuration of the printer 16. In FIG. 4, the printer 16 contains a system controller 82.

The system controller 82 can perform various control on the devices. Generally, a computer device (microcomputer, etc.) can be preferably applied to the system controller 82.

The components of the printer 16, that is, the power source switch 76, the print switch 78, and memory 84, are connected to the system controller 82, and the above-mentioned photographic unit 80 is connected to the system controller 82 through a print engine 86. Since these components are made of well knows members, the further explanation about the configurations, functions, etc. is omitted here.

The memory 84 is normally used as a buffer, and can also be used in temporarily storing transfer data to protect data against the damage caused by unexpectedly releasing a connection while transferring data between the printer 16 and the camera body 14.

A signal cable 51 is connected to the system controller 82, and the printer 16 is connected to the CPU 50 of the camera body 14.

In the block diagram (configuration of the printer 16) shown in FIG. 4, the printer 16 has a unique power source although omitted in the attached drawings. Although similarly omitted in FIGS. 1 and 2, the printer 16 contains a printer paper 17 in a rolled state (refer to FIG. 5).

Described below is the procedure of the operation (shooting, printing, etc.) of the digital camera 10 with the above-mentioned configuration.

First, the digital camera 10 in the stored state as shown in FIG. 2 is set in the using state as shown in FIG. 1. In this operating method, the coupled camera body 14 and printer 16 are held on each hand and then pulled to right and left, thereby pulling out the organic EL display 12 stored inside them in a wounded state.

Then, as shown in FIG. 1, the slide unit 18 is slid upward, projected outside from the camera body 14. Thus, the power is turned on and subject light is input to the taking lens 15 (refer to FIG. 3).

At this time, when the system enters the shooting mode, the shooting operation can be started. When the system enters another mode (reproduction mode), the cross cursor button 22 is operated and the mode is switched to the shooting mode.

FIG. 1 shows the shooting mode in which a shooting operation can be started. At this time, the organic EL display 12 functions as a finder. That is, a subject is displayed on the display screen 13 of the organic EL display 12. Although not shown in FIG. 1, the information (that is, a shooting status) about the status of a camera, a shooting mode, etc. can also be displayed together with the subject on the display screen 13 of the organic EL display 12.

In the shooting mode (single shooting mode) as shown in FIG. 1, the shooting operation is performed by fully pressing the shutter button 20. An image captured by the shooting operation is displayed as a still image on the organic EL display 12 (set in advance) for a predetermined time (normally a few seconds). Then (after a predetermined time has passed), the shooting mode (single shooting mode) is restored, and the organic EL display 12 functions as a finder.

Figure 5:
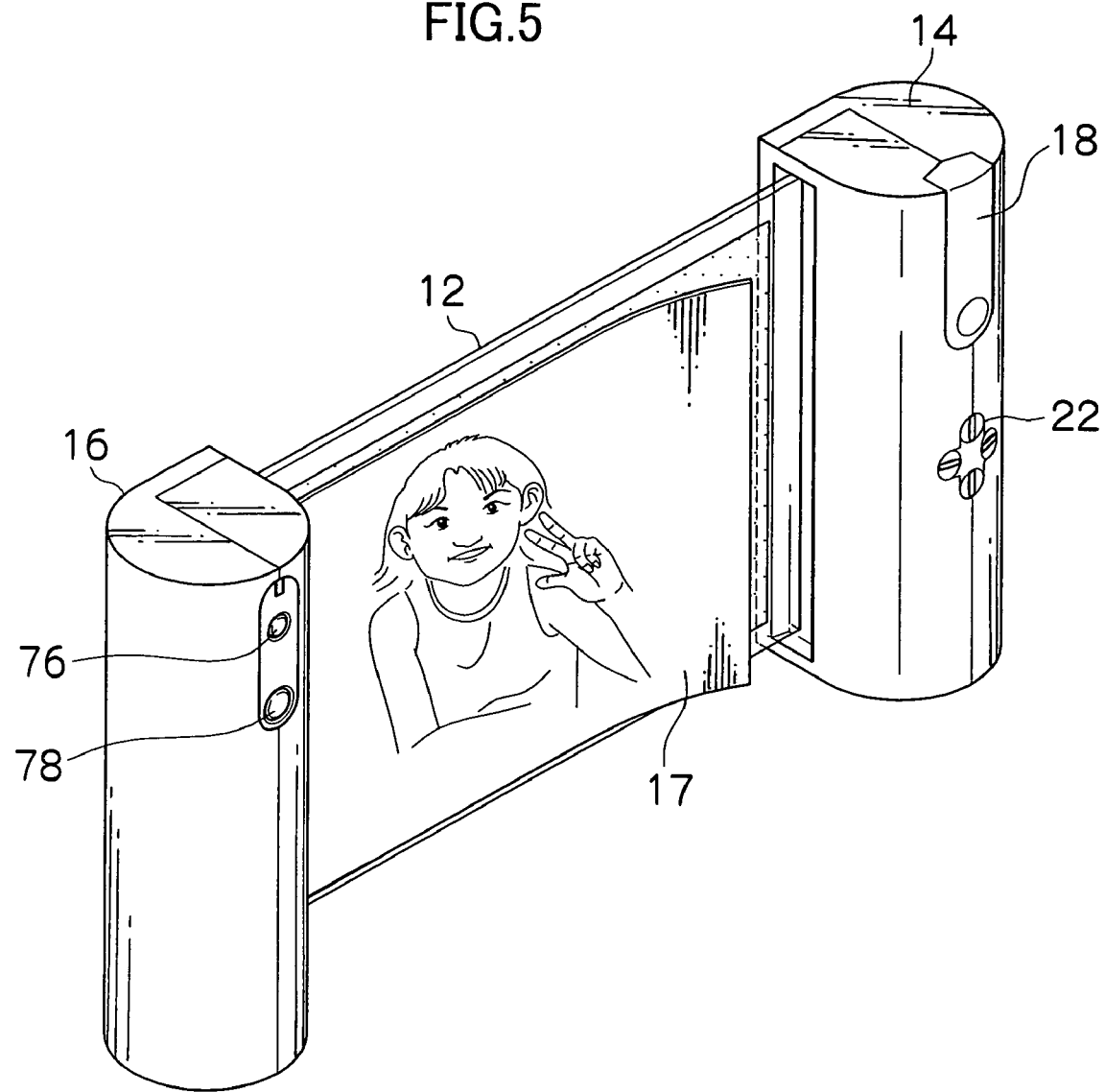
FIG. 5 is a perspective view of the appearance in the printing state of the digital camera according to an embodiment of the present invention.

Described below is the operation procedure of the printer 16. FIG. 5 is a perspective view showing the appearance of the digital camera 10 in the printing state according to an embodiment of the present invention. First, the power source switch 76 of the printer 16 is turned on, and then the camera body 14 is set in the reproduction mode to display an image to be printed on the organic EL display 12. Then, automatically or in the operation of the cross cursor button 22, the data of an image to be printed is written to the memory 84 of the printer 16.

Then, by operating the print switch (operation switch) 78 of the printer 16, the printing operation is started. That is, when an image is displayed on the organic EL display 12, the printing operation by the printer 16 can be performed. Then, as shown in FIG. 5, the printer paper 17 is ejected substantially parallel to the organic EL display 12.

In FIG. 5, the power source of the camera body 14 is in the OFF state, but there is no problem with the printing operation because the data of an image to be printed has already been written to the memory 84 of the printer 16.

As explained above, a taken image can be printed onto printing paper, etc. on the printer 16 immediately after shooting according to the present embodiment, and the entire system can be very compact in the stored state, which cannot be realized by the conventional technology.

The present embodiment of the digital camera of the present invention is described above, but the present invention is not limited to the above-mentioned embodiment, and various aspects can be realized.

For example, since the digital camera 10 according to the present embodiment can be very compact in the stored state, the optical zoom function and the strobe function, which are omitted herein, can also be added. With these functions, the compact design may be amended somewhat in the negative, but the functions of the digital camera can be greatly improved.

According to the present embodiment, the printer paper 17 is ejected substantially parallel to the surface of the organic EL display 12 to cover the display screen 13 of the organic EL display 12, but the configuration of ejecting the paper substantially parallel to the reverse side of the organic EL display 12 can also be realized.

Furthermore, although the organic EL display 12 is adopted as a planar image display device, another electronic display (for example, a liquid crystal display, etc. using a plastic film) can be used.

Described above are examples of a digital camera, but similar effects can be obtained as an equipment unit having a built-in shooting function such as a mobile telephone, a PDA, etc.

What is claimed is:

1. A digital camera, comprising:
   a planar image display device which is composed of a flexible electronic display;
   a camera body coupled to an end of the image display device;
   a printer device coupled to another end of the image display device and which can perform printing when the image display device displays an image; and
   an ejection device which ejects printing paper substantially parallel to the image display device when the printer device prints an image, and which ejects printing paper on the image display device so that the orientation of the image displayed on the image display device and the orientation of the image printed on the printer paper become the same orientation wherein:
   the camera body or the printer device can store the image display device in a wound state;
   the camera body and the printer device can be coupled to each other through a coupling device when the image display device is stored; and
   the camera body or printer device are formed into a substantially cylindrical housing and functions as a grip.

2. The digital camera according to claim 1, wherein the coupling device is a magnet provided at the camera body and the printer device.

3. The digital camera according to claim 1, wherein the image display device is wound into the camera body and/or the printer device through the slit aperture provided in the camera body and/or the printer device.

4. The digital camera according to claim 1, wherein the printer paper is contained in the printer device in a rolled state.

* * * * *